J. A. MAHLER.
TRANSMISSION MECHANISM.
APPLICATION FILED APR. 23, 1917.

1,284,401.

Patented Nov. 12, 1918.

INVENTOR
Joseph A. Mahler.
By Morsell, Keeney & French.
ATTORNEYS

UNITED STATES PATENT OFFICE.

JOSEPH A. MAHLER, OF BERLIN, WISCONSIN.

TRANSMISSION MECHANISM.

1,284,401.  Specification of Letters Patent.  Patented Nov. 12, 1918.

Application filed April 23, 1917. Serial No. 163,946.

*To all whom it may concern:*

Be it known that I, JOSEPH A. MAHLER, a citizen of the United States, and resident of Berlin, in the county of Green Lake and State of Wisconsin, have invented new and useful Improvements in Transmission Mechanism, of which the following is a description, reference being had to the accompanying drawings, which are a part of this specification.

The invention relates to power transmission mechanism.

The invention is more particularly designed to provide improvements in power transmission mechanism in which a differential drive is employed.

In the usual transmission mechanism employing a differential the wheels on opposite sides of the vehicle are driven at different speeds when turning a corner that is the inner wheel turns slower than the outer wheel by reason of the differential gearing between these wheels and the drive shaft. However, when the vehicle runs through loose soil, such as sandy or muddy ground, and one of the wheels gets into the sand or mud and the other one is on firm ground, the wheel in the sandy or muddy ground spins while the wheel on the firm ground practically stands still because of the differential drive with the result that much power is wasted and great difficulty is experienced in pulling the vehicle out. To obviate this difficulty this invention is designed to lock the differential so that both wheels will be driven at the same speed and tractive force with the result that the drive of the wheel on the firm ground will assist by its tractive force in getting the other wheel out of the sand or mud.

The invention is further designed to provide a lock on a four wheel drive transmission system of a vehicle.

The invention further consists in the several features hereinafter set forth.

Figure 1:
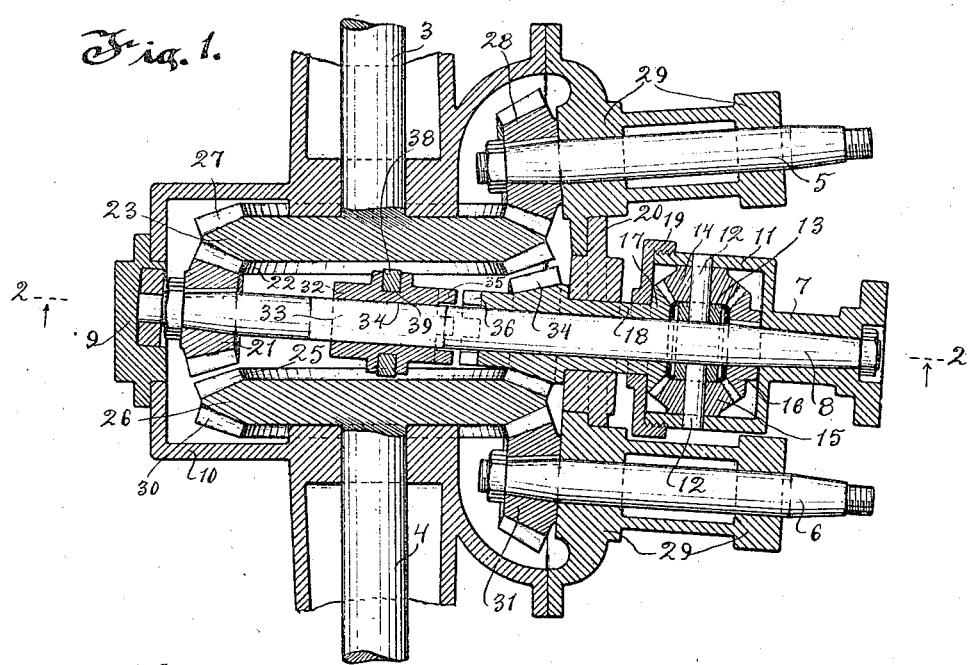
Figure 1 is a sectional view through the device embodying the invention.
Figure 2:
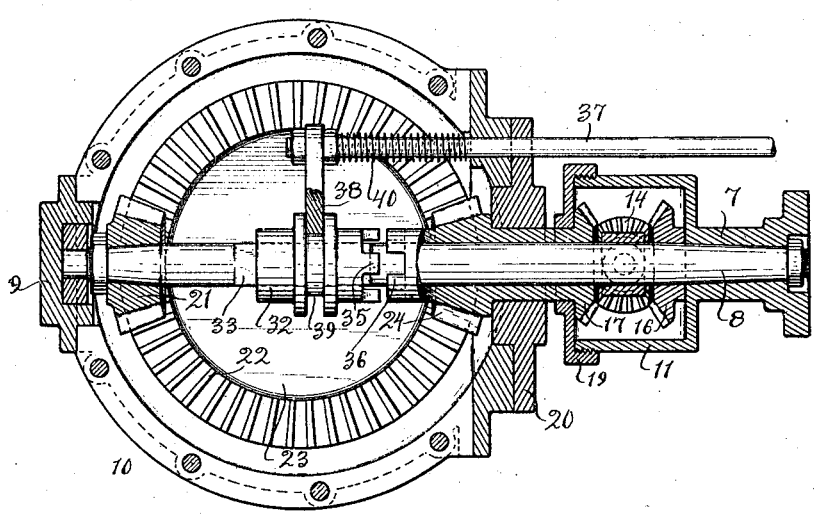
Fig. 2 is a section taken on the line 2—2 of Fig. 1.

As shown the invention is applied to a four wheel drive transmission in which 3 and 4 represents the drive shafts for the rear wheels of the vehicle and 5 and 6 the drive shafts operatively connected up through means (not shown) with the front wheels of the vehicle and in which 7 is the portion of the drive shaft of the vehicle operatively connected up by means (not shown) with the engine shaft.

The differential gear connects the drive shaft with the respective shafts of the wheels and consists of a differential shaft 8 journaled at one end in the shaft 7 and at its other end in an end thrust bearing 9 carried by the transmission casing 10 and further consists in other features hereinafter described. The drive shaft 7 has a hooded extension 11 carrying stud shafts 12 mounted in said extension and in a collar 13 revolubly mounted on the shaft 8. These stud shafts carry bevel gears 14 and 15 loosely mounted thereon. On one side these bevel gears mesh with a bevel gear 16 keyed or otherwise fixedly mounted on the shaft 8 and on the other side said gears mesh with a bevel gear 17 carried by a gear sleeve 18 loosely mounted on the shaft 8 and journaled in a cap 19 secured to the hood and a journal bearing 20 carried by the casing 10. The shaft 8 has a bevel gear 21 keyed or otherwise fixedly secured thereto which is in mesh with a bevel gear 22 on a member 23 carried by the shaft 3 journaled in the casing 10.

The sleeve 18 is provided with a bevel gear 24 which is in mesh with a bevel gear 25 on a member 26 carried by the shaft 4 journaled in the casing 10. In case of the four wheel drive the member 23 is provided with a bevel gear 27 in mesh with a bevel gear 28 fixedly secured to the shaft 5 journaled in bearings 29 carried by the casing 10 and the member 26 is provided with a bevel gear 30 in mesh with a bevel gear 31 fixedly secured to the shaft 6 journaled in bearings 29 carried by the casing 10.

With this construction it will be apparent that the shaft 3 is driven by the shaft 7 through the bevel gears 14, 15 and 16, shaft 8 and bevel gears 21 and 22 and the shaft 5 is also driven by these connections through the bevel gears 27 and 28 and that the shaft 4 is driven by the shaft 7 through the bevel gears 14, 15, 17, 24 and 25 and the shaft 6 through this drive and the bevel gears 30 and 31. If for any reason more resistance is put on either of the shafts 3 or 4 and 5 or 6 then the bevel gears 14 and 15 are free to turn about either of the gears 16 or 17 so that greater tractive force is imparted to the shafts on one side of the vehicle than those on the other. This is of course essential to permit of the proper turning of the vehicle but when the wheel or wheels on one side of the vehicle are in loose ground and a wheel or wheels on the other side are in firm ground this arrangement will cause the wheel or wheels in loose ground to spin and the tractive force of the wheel or wheels on the other side is greatly diminished with the result that the vehicle may be driven or pulled out with difficulty and with loss of power and time. To obviate this difficulty I have devised means used in combination with these parts to lock the differential by securing the sleeve member 18 with its gears 17 and 24 to rotate with the shaft 8.

This means consists in general of a clutch. The clutch comprises a clutch sleeve 32 slidably but non-rotatably mounted upon the shaft 8, a portion 33 of said shaft being squared fitting a square bore 34 of the sleeve, said sleeve having a clutch face 35 adapted to interlock with a clutch face 36 on the sleeve 18 whereby the sleeve 18 will be secured to rotate with the shaft 8. The clutch sleeve is shifted into and out of operative position by means of a shift rod 37 slidably mounted in the casing 10 and operated in any suitable manner by the operator of the machine, said rod secured to a forked member 38, the bifurcations of which fit in an annular groove 39 in the sleeve 32. The clutch is normally held out or in inoperative position by means of a spring 40 interposed between the casing and the member 38.

With this construction when the clutch sleeve 32 is shifted through the member 38 and rod 37 into engagement with the sleeve 18, said sleeve and gears 14, 15, 17 and 24 are thereby locked to the shaft 8 so that the drive will be direct from the engine shaft 7 through said gears and the gear 16 to the gears 22 and 25 to drive both the shafts 3 and 4 and also through the gearing connections previously described the shafts 5 and 6 so that an equal tractive force will be imparted to both the rear and in addition, in case of the four wheel drive, the front wheels whereby the wheel or wheels on firm soil will exert its or their tractive effect to pull out the wheel or wheels in the loose ground.

The invention thus exemplifies a simple and efficient construction well adapted for the purpose described.

I am aware that the details of construction herein shown and described are capable of variation and change but such changes as come within the scope of the appended claim I deem to be within the spirit of my invention.

What I claim as my invention is:

The combination, with the main drive shaft, of oppositely disposed wheel drive shafts, a differential drive shaft carrying a gear, a pair of differential gears carried by the main shaft and meshing with said gear, a revoluble member mounted on said differential shaft and carrying a gear in mesh with said differential gears, a gearing connection between said differential shaft and one of said wheel shafts, a gearing connection between said member and the other of said wheel shafts, another pair of oppositely disposed wheel drive shafts, a gearing connection between one of said second named wheel shafts and one of said first named wheel shafts, a gearing connection between the other of said second named wheel shafts and the other of said first named wheel shafts, and means for locking said member to move with said differential shaft whereby all of said shafts will be driven by the main shaft through their respective connections.

In testimony whereof, I affix my signature.

JOSEPH A. MAHLER.